United States Patent [19]

Su et al.

[11] Patent Number: 4,940,571
[45] Date of Patent: Jul. 10, 1990

[54] METHOD OF MAKING LARGE PARTICLE SIZE, HIGH PURITY DENSE SILICA

[75] Inventors: Sophia R. Su, Weston; Leo F. Fitzpatrick, Sandwich; Sheryl A. Robillard, Leominster, all of Mass.

[73] Assignee: GTE Laboratories Incorporated, Waltham, Mass.

[21] Appl. No.: 176,582

[22] Filed: Apr. 1, 1988

[51] Int. Cl.$^5$ ............................................ C01B 33/12
[52] U.S. Cl. ..................................................... 423/339
[58] Field of Search .................................. 423/338, 339

[56] References Cited

U.S. PATENT DOCUMENTS

| | | | |
|---|---|---|---|
| 2,974,105 | 3/1961 | Iler | 252/309 |
| 3,311,481 | 3/1967 | Sterry et al. | 106/57 |
| 3,538,015 | 11/1970 | Mindick et al. | 252/313 |
| 4,059,658 | 11/1977 | Shoup et al. | 264/43 |
| 4,246,139 | 1/1981 | Witt | 252/451 |
| 4,327,065 | 4/1982 | Dardel et al. | 423/338 |
| 4,426,216 | 1/1984 | Satoh et al. | 65/18.1 |
| 4,432,956 | 2/1984 | Zarzycki et al. | 423/338 |
| 4,436,542 | 3/1984 | Kurosaki | 65/18.1 |
| 4,560,399 | 12/1985 | Luong | 65/18.1 |
| 4,574,063 | 3/1986 | Scherer | 264/60 |
| 4,666,692 | 5/1987 | Taramasso et al. | 423/339 |
| 4,680,049 | 7/1987 | Onorato et al. | 65/18.1 |
| 4,788,046 | 11/1988 | Barringer et al. | 423/338 |

FOREIGN PATENT DOCUMENTS 865791 9/1981 U.S.S.R. ............................... 423/338

OTHER PUBLICATIONS

"The Chemistry of Silica by R. K. Iler", pp. 312 to 331 and pp. 554 to 568.
R. K. Iler, Journal of Colloid and Interface Science, vol. 57, No. 1, May 1980.
Sumio Sakka, *Gell Method for Making Glass*, Treatise on Materials Science and Technology, vol. 22, Glass III, 1982, pp. 129-165.
Wood, Rabinovich, Johnson, Jr., MacChesney, and Vogel, *Preparation of High-Silica Glasses from Colloidal Gels: I, Preparation for Sintering and Properties of Sintering Glasses*, Journal of the American Ceramic Society, vol. 66, No. 10, Oct. 1983, pp. 683-699, discusses a new method for preparing fused silica and high-silica glasses through the sol-gel process.
Jones, Emblem, and Hafez, *Formation of Glass-Like Materials from Ethyl Silicate*, proceedings of the second international workshop on glasses and glass ceramics from gels, Wurgburg, Jul. 1983, pp. 1-12.
Hanawa, Sudo, Kawachi, and Nakahara, *Fabrication of Completely OH-Free V.A.E. Fibre*, Elec. Ltrs., vol. 16, No. 18, Aug. 28, 1980, pp. 699-700.
Brinker, Keefer, Schaefer and Ashley, *Sol-Gel Transition in Simple Silicates*, Journal of Non-Crystalline Solids, 48 (1982), pp. 47-64.
Rabinovich, Johnson, MacChesney and Vogel, *Preparation of Transparent High-Silica Glass Articles from Colloidal Gels*, Journal of Non-Crystalline Solids, 47 (1982), pp. 435-439.
Susa, Matsuyame, Satoh, and Suganuma, *New Optical Fibre Fabrication Method*, Electronics Letters, 18, p. 499 [1982].
Tran and Koo, *Couplers by Using Gel Glass*, Electronic Letters, 5 Mar. 1981, vol. 12, No. 5, pp. 187-188.
Prassas, Phalippou, and Zarzychi, *Monolithicity of Silica Gels*, J. Phys.,Collog., 1982, No. 09, pp. 257-260.
Nogami and Moriya, *Glass Formation Through Hydrolysis of Si(OC$_2$H$_5$)$_4$ with NH$_4$OH and HCl Solution*, Journal of Non-Crystalline Solids 37 (1980), pp. 191-201.
Sakka and Kamiya, *The Sol-Gel Transition in the Hydrolysis of Metal Alkoxides in Relation to the Formation of Glass fibers and Films*, Journal of Non-Crystalline Solids 48 (1982), pp. 31-46.
Yamane, Aso, and Sakaino, *Preparation of a Gel from Metal Alkoxide and its Properties as a Precursor of Oxide Glass*, Journal of Material Science, vol. 13 (1978), pp. 865-870.8
Gavaghan, *Taking the Heat Out of Glass Making*, New Scientist, Apr. 11, 1985, p. 25.
Harmer, Puyane and Gonzalez-Oliver, *The Sol-Gel Method for Optical Fiber Fabrication*, IFOC, Nov./Dec. 1982, pp. 40-44.
Satoh, Sua, Matsuyama and Suganuma, *Effect of Atmosphere on Porous Gel Sintering*, Journal of Non-Crystalline Solids (1982), pp. 455-457.
Matsuyama, Susa, Satoh, and Suganuma, pi Synthesis of High-Purity Silica Glass by the Sol-Gel Method, Ceramic Bulletin, vol. 63, No. 11 (1984), pp. 1408-1411.
Yamane, Aso, Okano, and Sakaino, *Low Temperature Synthesis of a Monolithic Silica Glass by the Pyrolysis of a Silica Gel*, Journal of Materials Science, 14 (1979), pp. 607-611.
Kawaguchi, Hishikura, Iura, and Kokubu, *Monolithic Dried Gels and Silica Glass Prepared by the Sol-Gel Pro- (List continued on next page.)

Primary Examiner—John Doll
Assistant Examiner—Lori F. Cuomo
Attorney, Agent, or Firm—Frances P. Craig; Ivan L. Ericson

[57] ABSTRACT

A method of making large particle size, high purity, dense silica is described. Tetraethylorthosilicate ethanol solution is added to a 2N ammonium hydroxide solution containing silicic acid having an average particle size of about 15 micrometers to form a precipitate followed by a digestion of the precipitate in the solution. The precipitate is filtered through a screen having 45 micrometer openings and dried to form a dried powder. The dried powder is then calcined in an oxygen atmosphere followed by densifying it by heating at a temperature of about 1200° C. in air to form a large particle size, high purity, dense silica.

8 Claims, No Drawings

OTHER PUBLICATIONS cess, J. Non-Cryst., Solids 1984, vol. 63, No. 1-2, pp. 61-69.

Yamane, Inoue, Yasuori, *Sol-Gel Transition in the Hydrolysis and Silica Methoxide*, J. Non-Cryst. Solids, 1984, vol. 63, No. 1-2, pp. 13-21.

Dislich, *Glassy and Crystalline Systems from Gels: Chemical Basis and Technical Application*, Journal of Non-Crystalline Solids 57 (1983), pp. 371-388.

Sakka, Kamiya, Makita and Yamamoto, *Formation of Sheets and Coating Films from Alkoxide Solutions*, Journal of Non-Crystalline Solids 63 (1984), pp. 223-235.

Zelinski and Uhlann, *Gel Technology in Ceramics*, Journal Phys. Chem. Solids, vol. 45, No. 10, pp. 1069-1089.

W. Stober, A. Fink, E. Bohn, *Controlled Growth of Mono-Disperse Silica Spheres in the Micron Size Range*, J. Colloid and Interface Science, 26, 62-69 (1968).

E. Barringer, N. Judd, B. Fegly, R. Pober, H. Bowen, *Processing Monosized Powders*, Ultrastructure Processing of Ceramics, Glasses, and Composites, Ch. 26, 315-333 (1984).

Mitsubishi Metal Corp., *High-Purity Crucible*, Ceramic Industry, p. 3 (Jan. 1988), Japan.

Kline & Co., *Opportunities in Specialty Silicas*, pp. 1-7 (1987).

METHOD OF MAKING LARGE PARTICLE SIZE, HIGH PURITY DENSE SILICA

CROSS REFERENCE TO RELATED APPLICATION

A co-pending patent application Ser. No. S.N. 176,583, filed concurrently herewith, entitled "METHOD OF MAKING HIGH PURITY DENSE SILICA OF LARGE PARTICLE SIZE", and assigned to GTE Laboratories Incorporated assignee of the present application, concerns related subject matter of this application.

FIELD OF THE INVENTION

This invention relates to a method of making silica. More particularly, this invention relates to a method of making large particle size, high purity, dense silica.

BACKGROUND OF THE INVENTION

There is a pressing commercial and industrial demand for ultra pure, dense, large particle size silica having physical properties essentially the same as natural sand.

Many researchers have produced synthetic silica. For example, monodispersed silica powder has been prepared by a number of researchers. The Stober process was based on the controlled growth of spherical silica particles of uniform size, W. Stober, A. Fink and E. Bohn, Journal of Colloid and Interface Science 26, 62-69 (1968). The process included hydrolytic decomposition of tetraalkyl silicates (methyl or ethyl) and subsequent condensation of silicic acid in an alcoholic solution. Ammonia was used as a morphological catalyst. Particle size obtained in suspension ranged from less than 0.5 micrometers to 2 micrometers in diameter. By modifying the hydrolysis conditions, B. Fegley produced monosized $SiO_2$ powder with an average diameter of 0.55 micrometers, E. Barringer, N. Jubb, B. Fegley, R. L. Poker and H. K. Bowen, Ultrastructure Processing of Ceramics, Glasses, and Composites, 1984, pp. 315-333.

The polymerization of dilute silicic acid solution through nucleation and growth of silica particles in the presence of alkali salts or molybdic acid has been extensively studied by Iler and other groups, see R. K. Iler, Journal of Colloid and Interface Science, Vol. 75, No. 1, 1980, and "The Chemistry of Silica" by R. K. Iler, John Wiley & Sons Inc., (1979). Alexander and Iler reported the method of addition of alkalized acid sol, containing 2.4% silica to an alkaline sol containing 30% silica, in which the average diameter of silica particles increased to a final value of 60 micrometers from 45 micrometers in size.

U.S. Pat. No. 3,440,170 discloses a silica sol containing nonaggregated, uniform, spherical silica particles having a weight-average particle diameter of about 45-100 micrometers and a method of producing the sol by providing an alkaline silica sol containing silica particles having a weight-average diameter of about 10-30 microns.

U.S. Pat. No. 3,538,015 discloses the method to produce silica sols having water as the continuous phase and containing 30-70% by weight of uniform, nonaggregated silica particles having increased in diameter 2.5 to 4.0 times the original particle.

The aforementioned patents relate to the preparation of concentrated stable silica sols containing particles having a size from two to four times greater than those of original diluted sols. In addition, these sols contain trace amount of alkali metals or other foreign elements as stabilizers. The synthesis of ultra pure, dense, large particle size silica has not been reported.

In the present invention, we describe the method to prepare high purity, large particle size silica by hydrolytic decomposition of tetraalkylorthosilicates.

SUMMARY OF THE INVENTION

In accordance with one aspect of the present invention, a new and improved method for making large particle size, high purity, dense silica comprises the following steps:

Step 1—Tetraalkylorthosilicate is mixed with a solvent to form a solution having a molar ratio of the tetraalkylorthosilicate to the solvent of about 1 to about 3.

Step 2—The product of step 1 is added to an ammonium hydroxide solution containing silicic acid forming a precipitate of hydrated silica in the ammonium hydroxide solution containing silicic acid.

Step 3—The product of step 2 is digested.

Step 4—The product of step 3 is filtered to separate the precipitate from the filtrate.

Step 5—The precipitate from step 4 is dried to form a powder.

Step 6—The powder from step 5 is heated under a vacuum to remove any $H_2O$ and the solvent absorbed thereon.

Step 7—The product of step 6 is heated to form a high purity, dense silica having a particle size from about 100 micrometers to about 420 micrometers.

DETAILED DESCRIPTION OF THE PREFERRED EMBODIMENTS

One example of the new and improved method for making large particle size, high purity, dense silica comprises the following steps:

Step 1—Tetraethylorthosilicate is homogeneously mixed with ethanol to form a solution having a molar ratio of tetraethylorthosilicate to ethanol of about 1 to about 3.

Step 2—The product of step 1 is added to a 2N ammonium hydroxide solution containing silicic acid having an average particle size of about 15 micrometers forming a precipitate of hydrated silica in the solution.

Step 3—The product of step 2 is digested for a period of about 15 hours.

Step 4—The product of step 3 is filtered through a 325 mesh nylon screen to separate the precipitate from the filtrate.

Step 5—The precipitate from step 4 is air dried to form a powder.

Step 6—The powder from step 5 is vacuum baked at about 200° C. for about 12 hours to remove absorbed $H_2O$ and absorbed ethanol.

Step 7—The product of step 6 is calcined at a temperature of about 600° C. in an oxidizing atmosphere for a period of about 3 hours to form a calcined powder.

Step 8—The product of step 7 is heated at a temperature of about 1200° C. in air for a period of about 4 hours to form a large particle size, high purity, dense silica. The large particle size, high purity, dense silica is then screened through a 40 mesh then a 100 mesh screen to remove the coarse and fine particles. The resulting silica has a density from about 2.19 g/cc to about 2.21 g/cc, a particle size from about 100 micrometers to about 420 micrometers, and a Al, Ca, Fe, Na, K, Li combined content of less than 1.80 ppm.

The formation of silica gel takes place in two stages. In the first, initially formed $Si(OH)_4$ condenses to form colloidal particles. In dilute solution, a slow increase in particle size is the only subsequent change, but at a concentration of about 1% silica, these primary particles are able to condense together to give a very open but continuous structure, extending throughout the medium, thus bestowing a certain degree of rigidity upon it. In both stages of polymerization, the mechanism is the same, that is, condensation to form Si-O-Si links which lead to massive particles of silica. Two basic processes of particle growth of silica in the aqueous system were proposed by Vysotskii, "The Chemistry of Silica" by R. K. Iler, John Wiley & Sons, Inc. Chapter 3, pp. 172-311:

1. Growth of particles at the expense of silicic acid in the solution from the moment of its preparation.
2. Further growth of larger particles by deposition of silicic acid dissolving from the smaller particles.

In the light of the theory of polymerization of silicic acid, $Si(OH)_4$, from monomer to large particles, gels and powders, we describe a method of synthesizing high purity, large particle size silica by hydrolytic decomposition of silicon alkoxides. Silicon alkoxides, $Si(OR)_4$, ($R=CH_3$, $C_2H_5$) are hydrolyzed readily with water in the presence of a base catalyst to form silicic acid. When the concentration of the monomer is greater than the solubility of the solid phase of amorphous silica or in the presence of solid phase on which the soluble silica might be deposited, then the growth of the particle occurs. Higher molecular weight species of silicic acid would, then, be precipitated out. Furthermore, polymeric silicic acid was used as a nucleation agent to promote rate of particle growth in this invention. Tetraalkylorthosilicates such as tetramethylorthosilicate and tetraethylorthosilicate can be used to produce large size, high purity, dense silica. However, high purity tetraethylorthosilicate was the preferred tetraalkylorthosilicate employed to produce large size, high purity, dense silica in the present invention. Concentrated reagent grade or Ultrex Grade (Trademark of J. T. Baker) of $NH_4OH$, denatured or anhydrous ethanol were used in this invention. All reactions were carried out in polypropylene labware to prevent contamination by impurities.

BASE HYDROLYZED SYNTHETIC SILICA

Example 1.

420 ml of tetraethylorthosilicate (TEOS) was homogeneously mixed with 331 ml of ethanol in a separatory funnel (molar ratio of TEOS/ethanol=½). The ethanol solution of TEOS was added dropwise, at a rate of 6 ml/min, to 300 ml of 2N of $NH_4OH$ containing 1 gram of high purity silicic acid with average particle size of 15 micrometers in a 3 liter beaker. (1 gram of silicic acid was added for every 100 grams of silica powder produced.) Hydrated silica particles were precipitated within five minutes. The reaction mixture was agitated with a mechanical stirrer at low speed. The beaker was covered to prevent evaporation of the ethanol. The reaction mixture was further stirred for one hour after the addition of TEOS, and digested overnight before filtering. The precipitate was filtered through a nylon 325 mesh screen (45 micrometers), the screen was prewashed with hot distilled deionized water, and then the filtered precipitate was baked at 200° C. or higher in a vacuum oven for about 12 to about 24 hours to remove any physically absorbed water and ethanol, followed by calcination at 600° C. for 3-5 hours in air or oxygen flow to decompose residual organics. The final densification process was conducted at 1200° C., the silica so prepared was then sieved through a 40 mesh, 420 micrometers, screen (Tyler), then sieved through a 100 mesh, 150 micrometers, screen (Tyler) to remove the coarse and fine particles. The overall yield of silica with particle size in the range of 150 micrometers to 400 micrometers is about 75-80%. The purity of powders and physical properties are listed in Table I.

Example 2.

This example was the same as Example 1 except that 300 ml of 2N of $NH_4OH$ was added dropwise to the ethanol solution of TEOS containing 1.0 gram of silicic acid. After densification at 1200° C., the powder was sieved through a 140 mesh screen, 106 micrometers. The yield of silica having particle size greater than 106 microns was about 60% as compared to a yield of 85% if the reverse addition was made.

Example 3.

Under the same reaction conditions as Example 1, the concentration of $NH_4OH$ affects the particle size of the densified $SiO_2$. This example was the same as Example 1, except that the ethanol solution of TEOS was added to 300 ml of 5N of $NH_4OH$ containing 1.0 gram of silicic acid. After calcination at 1200° C., the densified silica was then sieved through a 140 mesh screen. The yield of silica having particle size greater than 106 micrometers was about 65% as compared to the 83% yield if 300 ml of 2N $NH_4OH$ was used.

Example 4.

Under the same conditions as Example 1, the rate of addition of TEOS to $NH_4OH$ solution did not have any effect on the particle growth. The procedure of this example was the same as Example 1, except that the addition of the ethanol solution of TEOS to 300 ml of 2N $NH_4OH$ containing 1.0 gram of silicic acid was completed in 20 minutes. A control batch (procedures were identical to Example 1) was run at the same time as a comparison. After the densification process, the $SiO_2$ powder was sieved through 140 mesh screen. The yield of silica having particles greater than 106 microns was about 83% for both batches.

Example 5.

Under the same reaction condition as Example 1, the molar ratio of TEOS to ethanol to $NH_4OH$ used during hydrolysis profoundly affected the particle morphology and particle growth of silica. 420 ml of tetraethylorthosilicate (TEOS) was homogeneously mixed with 330 ml of ethanol in a separatory funnel. This reaction mixture was then added dropwise to 500 ml of 1N $NH_4OH$ containing 1.0 gram of silicic acid. The addition was completed in 1½ hours. The pH of the reaction mixture was acidic (pH=6). At this concentration, turbidity was observed after approximately 30 minutes. Further addition of 100 ml of ethanol and 100 ml of 5N $NH_4OH$ to the turbid mixture, the mixture was gelled immediately. The gel was dried in a vacuum oven at 200° C. to remove physically absorbed water, followed by firing at 600° C. in air or oxygen, and then densifying at 1200° C. in air. The silica obtained was then sieved through a 140 mesh screen. The shape of the silica was irregular; its surface area was approximately 0.2 m²/g, with a density of 2.185 g/cc, and mean particle size of 165 micrometers.

Example 6.

Two batches were run under the same reaction conditions as described in Example 1 except one batch was seeded with 1.0 gram of silicic acid, and other batch without seeding. After densification at 1200° C., the yield of silica having particle size greater than 106 micrometers was 80% for batch seeded with silicic acid, whereas the yield for an unseeded batch was less than 65%. This example indicates that silicic acid works as a nucleation agent and promotes the growth of silica gel particles.

The unique characteristics of the silica made in accordance with the present invention are:

Base Hydrolyzed Process

| Characteristics | Values |
| --- | --- |
| High process yield with particle size range of 100 μm to 420 μm | 70% |
| High True Density (theoretical density of amorphous silica: 2.17–2.20 g/cc) | 2.10–2.18 g/cc |
| High Tap Density | 42.0–48.0% of True Density |
| Low Surface Area | 0.3 m²/g |
| Ultra High Purity | Al+Ca+Fe: less than 0.8ppm Total alkali (Na+K+Li): less than 1.0 ppm |
| Carbonaceous residue | None |
| Absorbed/chemically bound H₂O | less than 200 ppm |

The physical requirements of the silica powder made by the method of this invention meet the physical requirements of silica powder to be used for fabrication of high purity quartz crucibles.

These requirements are:
Particle size should be in the range of 100 micrometers to 420 micrometers. If particle size is larger than 420 micrometers, low packing density is observed. If particle size is smaller than 100 micrometers, gaseous species will be trapped inside and bubble formation occurs.
High true density and tap density, low surface area to avoid entrappment of gas inside the particle
Low OH content, H₂O content of fused quartz has a direct effect on viscosity. High OH content will lower annealing point of quartz crucible. OH content should not exceed 300 ppm.
High purity requirements are:
Al: 2.0 ppm maximum
Ca and Fe: 0.5 ppm each maximum
Na+K+Li: total of 1.0 ppm maximum
to avoid crucible defects (black specks, light spots and bubbles) and to avoid any contamination of silicon crystals drawn using crucibles made from the silica powder.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of making silica comprising the following steps:
    Step 1—mixing tetraalkylorthosilicate with a solvent to form a solution having a molar ratio of said tetraalkylorthosilicate to said solvent of about 1 to about 3;
    Step 2—adding the product of step 1 to an ammonium hydroxide solution containing silicic acid forming a precipitate of hydrated silica in said ammonium hydroxide solution containing silicic acid;
    Step 3—digesting the product of step 2;
    Step 4—filtering the product of step 3 to separate the precipitate from the filtrate;
    Step 5—drying the precipitate from step 4 to form a powder;
    Step 6—heating the powder from step 5 under a vacuum to remove any H₂O and said solvent absorbed thereon;
    Step 7—heating the product of step 6 to form silica having a particle size from about 100 micrometers to about 420 micrometers and a surface area from about 0.2 m²/g to about 0.3 m²/g.

2. A method of making silica in accordance with claim 1 wherein said tetraalkylorthosilicate in Step 1 comprises tetraethylorthosilicate.

3. A method of making silica in accordance with claim 1 wherein said solvent in Step 1 comprises ethanol.

4. A method of making silica in accordance with claim 1 wherein said Step 2 comprises adding 2N ammonium hydroxide solution containing silicic acid to form a precipitate of hydrated silica in said 2N ammonium hydroxide solution containing silicic acid.

5. A method of making silica in accordance with claim 1 wherein said Step 3 comprises digesting the product of Step 2 for a period of about 15 hours.

6. A method of making silica in accordance with claim 1 wherein said Step 7 comprises heating the product of Step 6 at a temperature of about 600° C. in an oxidizing atmosphere for a period of about 3 hours and then heating at a temperature of about 1200° C. in air for a period of about 4 hours to form silica having a particle size from about 100 micrometers to about 420 micrometers.

7. A method of making silica comprising the following steps:
    Step 1—homogeneously mixing tetraethylorthosilicate with ethanol to form a solution having a molar ratio of tetraethylorthosilicate to ethanol of about 1 to about 3;
    Step 2—adding the product of step 1 to a 2N ammonium hydroxide solution containing silicic acid having an average particle size of about 15 micrometers forming a precipitate of hydrated silica in said ammonium hydroxide solution containing silicic acid;
    Step 3—digesting the product of step 2 for a period of about 15 hours;
    Step 4—filtering the product of step 3 through a 325 mesh nylon screen to separate the precipitate from the filtrate;
    Step 5—drying the precipitate from step 4 in air to form a powder;
    Step 6—baking the powder from step 5 in a vacuum oven at about 200° C. for about 8 to about 12 hours to remove any H₂O and said ethanol absorbed thereon;

Step 7—calcining the product of step 6 at a temperature of about 600° C. in an oxidizing atmosphere for a period of about 3 hours to form a calcined product; and Step 8—heating the product of step 7 at a temperature of about 1200° C. in an air atmosphere for a period of about 4 hours to form silica having a density from about 2.19 g/cc to about 2.21 g/cc, a particle size from about 100 micrometers to about 420 micrometers, a surface area from about 0.2 m²/g to about 0.3 m²/g and a Al, Ca, Fe, Na, K, Li combined content being less than 1.8 ppm.

8. A method of making silica comprising the following steps:

Step 1—mixing tetraalkylorthosilicate with a solvent to form a solution having a molar ratio of said tetraalkylorthosilicate to solvent of about 1 to 3;

Step 2—adding the product of step 1 to an ammonium hydroxide solution containing silicic acid forming a precipitate within a period of from about 1 to about 60 minutes of hydrated silica within said ammonium hydroxide solution containing silicic acid;

Step 3—digesting the product of step 2;

Step 4—filtering the product of step 3 to separate the precipitate from the filtrate;

Step 5—drying the precipitate from step 4 to form a powder;

Step 6—heating the powder from step 5 under a vacuum to remove any H₂O and said solvent absorbed thereon;

Step 7—heating the product of step 6 to form silica having a density from about 2.19 g/cc to about 2.21 g/cc, a particle size from about 100 micrometers to about 420 micrometers, a surface area from about 0.2 m²/g to about 0.3 m²/g, and a combined impurity content of less than 2.5 ppm.

* * * * *